United States Patent [19]

Miller

[11] 4,293,309

[45] Oct. 6, 1981

[54] METHOD OF OBTAINING AND RECORDING SEISMIC AND GEOCHEMICAL DATA

[75] Inventor: Sylvester T. Miller, Midland, Tex.

[73] Assignee: STM Corporation, Midland, Tex.

[21] Appl. No.: 125,178

[22] Filed: Feb. 27, 1980

[51] Int. Cl.³ .......................................... G01N 33/24
[52] U.S. Cl. ................................ 23/230 EP; 73/153; 346/33 WL
[58] Field of Search .................. 23/230 EP; 73/32 A; 299/19; 166/336; 346/33 WL; 73/153

[56] References Cited

U.S. PATENT DOCUMENTS 2,192,525 3/1940 Rosaire ................................ 73/153
2,686,108 8/1954 Hoffmeister .
3,711,765 1/1973 Overton ........................ 23/230 EP Primary Examiner—Ronald Serwin Attorney, Agent, or Firm—Richards, Harris and Medlock

[57] ABSTRACT

A method is disclosed for determining the location of hydrocarbon reservoirs which comprises the steps of drilling boreholes along a linear path to a depth below the weathered zone, sampling the soil and drilling fluid found at the bottom of the boreholes for the presence of constituents, such as gaseous hydrocarbons and bacteria, indicating the presence of hydrocarbons, detonating explosive charges at the bottom of the boreholes to seismically determine the geological structure of the test area and plotting the resultant values for the constituent presence and geological structure data, with the plot having a common axis representing the linear path along which the boreholes are drilled. This method permits multiple and distinct indications of the presence of hydrocarbon reservoirs to be integrated to more uniformly and reliably predict the presence of a hydrocarbon reservoir.

11 Claims, 1 Drawing Figure

METHOD OF OBTAINING AND RECORDING SEISMIC AND GEOCHEMICAL DATA

TECHNICAL FIELD

This invention relates to a method of locating hydrocarbon deposits in the ground by integrating seismic and geochemical data obtained at the site under investigation.

BACKGROUND ART

The importance of developing a method for finding deposits of hydrocarbons in the ground with a high degree of accuracy cannot be questioned in these days of energy shortages. Typical location methods are described and claimed in U.S. Pat. Nos. 2,686,108 issued to Hoffmeister on Aug. 10, 1954, and entitled "Microfossil Prospecting for Petroleum" and 3,711,765 issued to Overton on Jan. 16, 1973, and entitled "Method of Locating Anomalous Zones of Chemical Activity in a Well Bore". The methods of these patents include measuring the microfossil content in boreholes drilled in the ground to locate ancient shorelines near where hydrocarbons deposits are commonly found and measuring the cationic potentials and redox potential of shale cuttings obtained from well bores, respectively.

Another method known in the art for locating hydrocarbon deposits is the use of explosives detonated within the ground to produce a seismic profile of the area being investigated to determine the existence of a geological formation suggesting the presence of hydrocarbons. Typically this method includes drilling a series of boreholes to a depth below the weathered zone with the boreholes being a uniform, predetermined distance from one another along a linear path. Explosives are then placed at the bottom of each borehole and detonated individually. Seismic devices on the ground above record the ground vibrations induced by the explosion. Upon the completion of data collection for the boreholes, a profile of the density under the ground may be plotted by combining the data, which may indicate the presence of a hydrocarbon reservoir.

Another method for locating hydrocarbon deposits is the use of geochemical data from the site under investigation. In this technique, sample holes are drilled typically to a depth of 5 feet below the surface. A sample is then taken from the bottom of the testhole and analyzed for the presence of the lighter hydrocarbons, C-1 through C-6. The presence of ethane (C-2) and propane (C-3) are taken as a definite indication of the presence of hydrocarbon reservoirs. In a similar manner, the type and concentration of certain bacteria may also indicate the presence of hydrocarbons.

Such prior art methods have suffered the shortcoming of only indicating one of a number of indications of the presence of hydrocarbons. A need has thus arisen for integrating or combining the data obtained by exploratory methods to more accurately and reliably predict the presence of hydrocarbons.

DISCLOSURE OF THE INVENTION

The method forming the present invention achieves the result of effectively integrating the data obtained by discrete exploratory methods. The method includes drilling boreholes to a depth below the weathered zone, obtaining soil and drilling fluid samples from the bottom of those boreholes and analyzing those samples to determine the presence of constituents indicating the presence of a hydrocarbon reservoir. Such constituents include the lighter hydrocarbons. The boreholes are then filled with explosives, which are detonated to provide a density profile of the ground under investigation which is plotted on a chart. The presence of the constituents, such as the lighter hydrocarbons are then plotted along the same axis as the seismic data indicating the linear distance between boreholes. In addition, the soil and drilling fluids recovered from the bottom of the boreholes may be analyzed for the presence and concentration of hydrocarbon indicating bacteria. This data may also be plotted along the same axis.

In the method of the present invention, there is no longer a need to drill the 5 foot deep test holes formerly employed in the geochemical technique described above. This greatly reduces the cost of exploration, and also leads to a higher degree of accuracy as the presence of the lighter hydrocarbons at depths of 5 feet in the ground may be affected by other factors related to the test samples relative nearness to the surface. The most significant advantage of the method of the present invention is the capability of plotting the data obtained from seismic and geochemical investigations on a common axis, and thereby visually comparing the indications suggesting hydrocarbons deposits from a plurality of discrete data. This significantly increases the accuracy and reliability of the search for commercially viable hydrocarbon deposits in the ground.

DESCRIPTION OF THE DRAWINGS

A more complete understanding of the invention may be had by reference to the following detailed description when taken in conjunction with the accompanying drawings, wherein.

DETAILED DESCRIPTION

Figure 1:
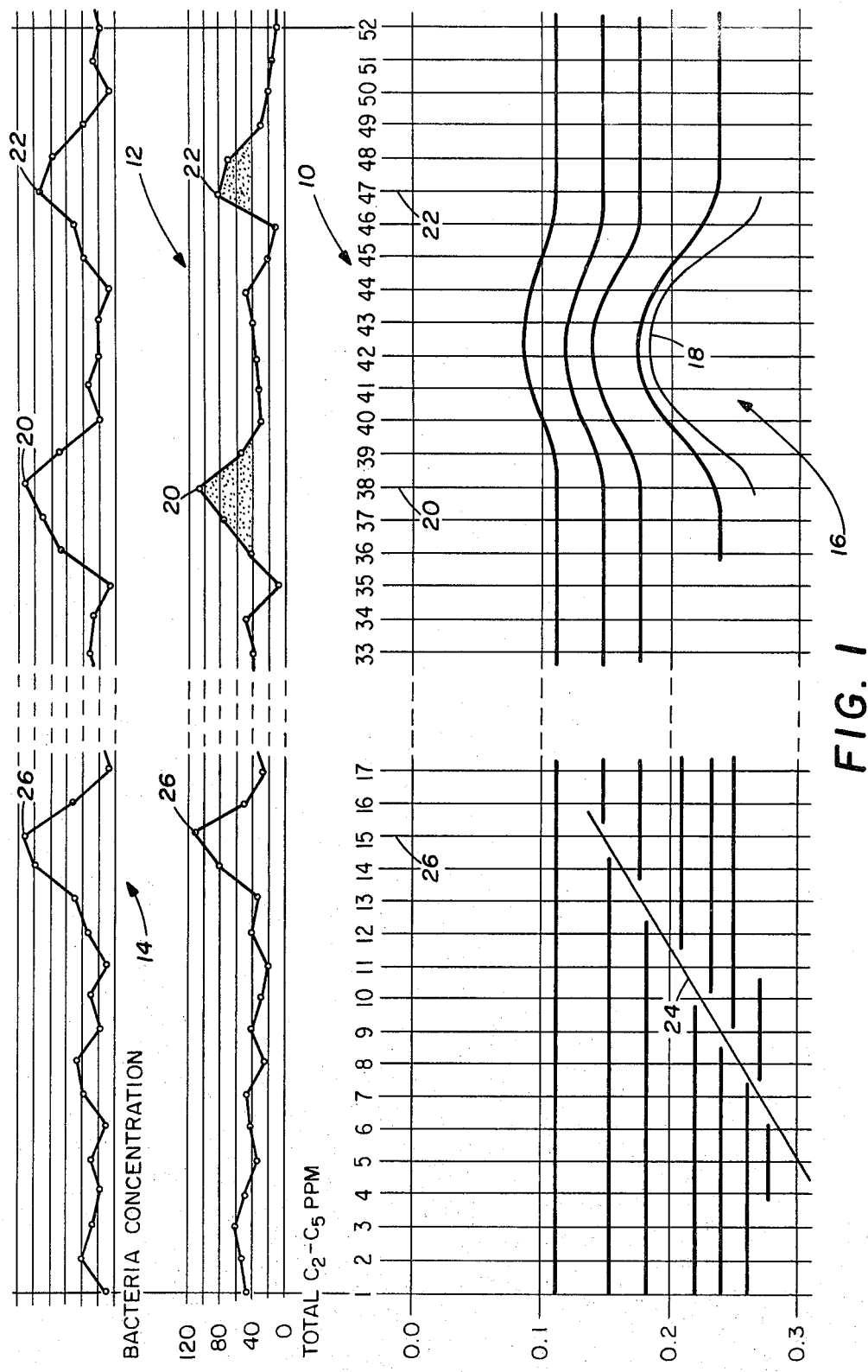
FIG. 1 is a representative plot of the data obtained from seismic and geochemical investigations according to the method of the present invention.

Commercially significant deposits of hydrocarbons are typically found in an anticlinal reservoir or trapped within a geological fault referred to as a fault trap. In commercially recoverable hydrocarbon deposits of the anticlinal reservoir type, very little gaseous hydrocarbons escape through the cap rock above the reservoir. However, the gaseous hydrocarbons do escape slowly around the edges of the anticline and migrate upwards toward the surface. Their presence in the soil tends to indicate the existence of such a reservoir in the near vicinity. Similar concentrations of gaseous hydrocarbons are found above productive fault traps. The gaseous hydrocarbons of interest are the lighter hydrocarbons C-1 through C-6. Their presence in the ground are considered significant to locate a productive reservoir.

The prior known methods for determining the presence of the lighter hydrocarbons employed testholes drilled to a depth of 5 feet in the ground, with the sample analyzed for hydrocarbon content taken from the bottom of that testhole. Those methods are often subject to inaccuracies created by the failure to drill below the relatively more active soil in the weathered zone near the ground surface.

The weathered zone can be defined as a belt of unconsolidated material that extends from the surface to the first ground water table. The weathered zone may contain decayed plant and animal matter, which are also sources of methane (C-1) which may vary the concentrations of C-1 through C-6 near the surface. The weathered zone may also be contaminated from rain or surface water seepage which can alter the hydrocarbon concentration. The thickness of the weathered zone may vary from several inches to several hundred feet. For example, where solid rock is encountered on the surface, the weathered zone may be only a few inches in depth. However, a lake or river bed may have a weathered zone several hundred feet deep.

In the method of the present invention, a series of boreholes are drilled along a generally linear path in a region suspected of having hydrocarbon deposits. Each borehole is drilled at equal distances from the other boreholes, or as close as commercially feasible. Each borehole is drilled to a depth below the weathered zone for the particular region. This type of borehole is well known in the prior art and presents no difficulties or new techniques to the drilling unit.

A sample of the bottom soil in each borehole is taken. The bottom samples are collected under controlled and uncontaminated conditions. The samples are analyzed for the concentration of lighter, gaseous hydrocarbons, C-1 through C-6, which may be absorbed and adsorbed by clayey material in the bottom sample. The hydrocarbons are acid-extracted from the clayey material by extraction apparatus and their concentration measured individually by instrumentation, such as a Perkin-Elmer Sigma 2 Chromatograph with a Sigma 10 Recorder.

A sample of the drilling fluids is also collected from each of the boreholes and placed in a sealed glass container. The containers are then heated to 100° C. in a water bath. A known amount of air space gas is collected by a syringe and injected into the Chromatograph. The gas sample is taken through a column by an inert carrier gas and is separated into methane (C-1), ethane (C-2), propane (C-3), isobutane (iC-4), and normal butane (nC-4), and C-5 and C-6 hydrocarbons. Sigma 10 Recorder may be used to illustrate the presence of each component.

The method of the present invention has the significant advantage of taking the samples from a depth below the weathered zone. This avoids the surface effects on the hydrocarbon content present in the known techniques when the weathered zone lies below a depth of 5 feet. The method of the present invention also has the significant advantage of permitting the samples to be taken from boreholes that may be later used for seismic evaluation of the ground. One of the requirements and prerequisites of seismic evaluation of the ground by using dynamite placed in shot holes is that the shot hole must be drilled to a depth below the weathered zone to facilitate accurate velocity measurements. The method of the present invention thereby simplifies the task of collecting both seismic and geochemical data and reduces the total expense necessary to collect the data.

After collection of the samples from the bottom of the boreholes, a charge of dynamite or other explosive is placed at the bottom of each borehole. A series of seismic recorders are then distributed at points around the area under investigation in a manner well known in the prior art. The explosive in each borehole is detonated independently, and the resulting pressure waves through the ground are recorded on the seismic recorders. Explosives are detonated in each of the boreholes until sufficient data is obtained to plot the density variations of the ground in the immediate area against the linear distance along the drill sites for the boreholes. As discussed above, the presence of an anticlinal formation, or a fault trap, would indicate the presence of hydrocarbon deposits.

Referring now to FIG. 1, there is illustrated a typical graph resulting from the method of the present invention. As can be readily seen, the horizontal axis of the graph represents the linear distance along the path of the drilling of the boreholes with the location of each borehole noted. In region 10, the seismic data obtained from the detonation of explosives in the boreholes is plotted. The vertical axes, or ordinate, is typically plotted in time units, representing the time necessary for the pressure waves generated by the explosions to travel through the earth. Immediately above region 10 is a hydrocarbon profile 12. The horizontal axis, or borehole location, of the profile corresponds precisely to the abscissa of the seismic data region 10. The vertical axis, or ordinate, of the hydrocarbon profile 12 indicates the concentration of the lighter hydrocarbons, typically in parts per million. In FIG. 1, an average concentration of the lighter hydrocarbons C-2 through C-5 are illustrated. C-1 is typically not included in the average as its value is greatly affected by the presence of ground water and lignites resulting in a poor indication of hydrocarbon deposits.

It is immediately clear from FIG. 1 that this graphical representation permits an immediate analysis of the relative geochemical data, representated by the concentration of lighter hydrocarbons, and the seismic data in a given region. There are thus two separate are independent data inputs, both of which indicate the presence of hydrocarbons, which may be combined or integrated to more accurately and reliably indicate the presence of hydrocarbon reservoirs in the ground.

It is known that certain types of bacteria are able to thrive in the presence of certain hydrocarbons. The soil and drilling fluid samples taken for each borehole in accordance with the method of the present invention may also be analyzed to determine the type and concentration of bacteria therein.

The relative types and concentrations of hydrocarbon related bacteria may be plotted on a third graph, represented by region 14 in FIG. 1. The horizontal axis, or abscissa of region 14 again exactly corresponds to the borehole location axis of region 10 and hydrocarbon profile 12. In this manner, the relative type and concentration of bacteria may be combined with the seismic and lighter hydrocarbon concentration data to significantly increase the ease and reliability of predicting the presence of hydrocarbon reservoirs in the ground.

The seismic profile in region 10 of FIG. 1 shows the two classic geological formations wherein commercially productive deposits of hydrocarbons are typically found. An anticlinal reservoir 16 is shown. This structure may typically be formed by a upheaval in the ground due to any number of geologically related influences. Hydrocarbons may be trapped within this dome-like structure, with a dense and impermeable cap rock 18 forming the upper portion of the reservoir 16 which prevents loss of the hydrocarbon by diffusion through the ground. In this type of geological formation, the hydrocarbon tends to slowly escape around the edges of the cap rock and diffuse slowly toward the surface. The boreholes 20 and 22, located at the edges of the anticlinal reservoir 16 have significantly high concentrations of hydrocarbons as shown by the hydrocarbon profile 12. This would indicate the presence of a commercially recoverable quantity of hydrocarbons in the reservoir 16.

The second common geological formation wherein hydrocarbons are commonly found is fault trap 24. Fault trap 24 may be formed by a shifting of relative strata of the ground. Typically such faults are slanted at an angle relative to the ground surface. Hydrocarbons migrate up the fault by means of capillary action and diffusion and are subsequently trapped within the upper portion of fault trap 24 in a reservoir. The lighter, gaseous hydrocarbons typically diffuse slowly upwardly from the reservoir in fault traps such as trap 24. As can be seen on FIG. 1, borehole 26 has indicated a significantly increased concentration of the lighter hydrocarbons in the immediate area of the upper part of fault trap 24. This also would indicate the present of commercially recoverable hydrocarbon deposits in a reservoir in trap 24.

As can be seen by the plot of bacteria type and concentration in region 14 of FIG. 1, the presence of hydrocarbons in anticlinal reservoir 16 and fault trap 24 are also indicated by the abnormally high and dense concentration of hydrocarbon indicating bacteria. This fact reinforces the indications of hydrocarbon deposits from the seismic data recorded in region 10 and the lighter hydrocarbon concentration in hydrocarbon profile 12.

It can be readily seen from the description above, and FIG. 1, that the method of the present invention forms a powerful tool for exploring for hydrocarbon deposits. The method permits the combination and integration of several known and improved techniques indicating the presence of hydrocarbons into a form such that the results of each technique may reinforce the results of the others. This clearly leads to a more accurate and reliable method for detecting commercially recoverable hydrocarbon deposits, and forms a substantial improvement in the hydrocarbon exploration field. The method is not limited to integration of those techniques discussed above, but may integrate any number of techniques now known or developed in the future.

Although particular steps and techniques in the method of the invention have been illustrated in the accompanying drawing and described in the foregoing detailed description, it will be understood that the invention is not limited to the steps and techniques disclosed, but is capable of numerous rearrangements, modifications, and substitutions of steps and techniques without departing from the spirit of the invention.

I claim:

1. A method for locating hydrocarbon deposits beneath the ground comprising the steps of:
   drilling a plurality of boreholes in a test area to a predetermined depth;
   collecting samples from selected ones of each of said plurality of boreholes at said predetermined depth;
   generating a pressure pulse within each of said plurality of boreholes at said predetermined depth at discrete time intervals to thereby generate pressure waves through the ground at the surface of said plurality of boreholes to determine geological structure at said plurality of boreholes;
   analyzing said samples from selected ones of each of said plurality of boreholes for constituents indicating the presence of hydrocarbon deposits; and
   processing said pressure waves at selected ones of said plurality of boreholes and said analyses of constituents in said samples from corresponding ones of said plurality of boreholes to determine the presence and location of hydrocarbon deposits within the test area.

2. The method of claim 1 wherein the step of analyzing said samples for constituents indicating the presence of hydrocarbon deposit comprises analyzing said samples for the presence of light, gaseous hydrocarbons from the group consisting of C-1 through C-6.

3. The method of claim 2 wherein the step of collecting samples from selected ones of each of said plurality of boreholes comprises the steps of collecting soil samples and drilling fluid samples, said step of analyzing said samples further comprising acid extracting said light, gaseous hydrocarbons absorbed and adsorbed in said soil samples and collecting a known amount of gas from above the drilling fluid samples to determine the concentration of light, gaseous hydrocarbons.

4. The method of claim 1 wherein said step of analyzing said samples for constituents indicating the presence of hydrocarbon deposits comprises analyzing said samples for the type and concentration of bacteria found in the presence of hydrocarbons in said samples.

5. The method of claim 1 wherein said step of drilling a plurality of boreholes to a predetermined depth comprises the step of drilling the plurality of boreholes to a depth below the weathered zone in the test area.

6. A method for locating hydrocarbon deposits underneath the ground comprising the steps of:
   drilling a plurality of boreholes in a test area, each of said plurality of boreholes being drilled to a predetermined depth and each of said plurality of boreholes being located a known distance from the next adjacent borehole;
   collecting samples from the bottom of each of said plurality of boreholes;
   analyzing said samples for constituents indicating the presence of hydrocarbon deposits;
   placing explosives at the bottom of each of said plurality of boreholes;
   detonating each explosive at discrete intervals;
   measuring the pressure waves generated by said detonations with seismic metering instruments placed above ground; and
   plotting the pressure waves generated at the surface from said detonation in each of said plurality of boreholes and constituents present in corresponding ones of said samples from each of said plurality of boreholes on a common axis representing the location of said plurality of boreholes to thereby permit comparison of the geological structure and constituent presence at each of said plurality of boreholes.

7. The method of claim 6 wherein the step of analyzing said samples for constituents indicating the presence of hydrocarbon deposit comprises analyzing said samples for the presence of light, gaseous hydrocarbons from the group consisting of C-1 through C-6.

8. The method of claim 6 wherein the step of collecting samples from said plurality of boreholes comprises the steps of collecting soil samples and drilling fluid samples, said step of analyzing said samples further comprising acid extracting said light, gaseous hydrocarbons absorbed and adsorbed in said soil samples and collecting a known amount of gas from above the drilling fluid samples to determine the concentration of light, gaseous hydrocarbons.

9. The method of claim 6 wherein said step of analyzing said samples for constituents indicating the presence of hydrocarbon deposits comprises analyzing said samples for the type and concentration of bacteria found in the presence of hydrocarbons in said samples.

10. The method of claim 6 wherein said step of drilling a plurality of boreholes to a predetermined depth comprises the step of drilling said plurality of boreholes to a depth below the weathered zone in the test area.

11. A method for finding hydrocarbon reservoirs underneath the ground comprising the steps of:
  drilling a plurality of boreholes in a test area along a generally linear path, each of said plurality of boreholes being drilled to a depth below the weathered zone in the test area and each of said plurality of boreholes being spaced a known distance from immediately adjacent boreholes;
  collecting soil samples and drilling fluid samples from the bottom of each of said plurality of boreholes;
  analyzing said soil samples and said drilling fluid samples for constituents indicating the presence of hydrocarbon deposits, said constituents comprising light, gaseous hydrocarbons C-1 through C-6 and bacteria associated with the presence of hydrocarbons;
  placing explosives at the bottom of each of said plurality of boreholes;
  detonating said explosives at discrete time intervals in each of said plurality of boreholes;
  measuring the pressure waves generated by each of said detonations by seismic measuring devices placed above ground to determine the geological structure of the test area; and
  plotting the geological structure of the test area and the presence of said constituents on a common axis representing the linear path along which each of said plurality of boreholes are drilled to thereby permit comparison of the geological structure and constituent presence at each of said plurality of boreholes.

* * * * *

UNITED STATES PATENT AND TRADEMARK OFFICE
CERTIFICATE OF CORRECTION

PATENT NO. : 4,293,309
DATED : October 6, 1981
INVENTOR(S) : SYLVESTER T. MILLER It is certified that error appears in the above-identified patent and that said Letters Patent are hereby corrected as shown below:

Column 4, line 15-16, "borehole location" should be --abscissa--

Column 4, line 17, "abscissa" should be --borehole location--

Column 4, line 30, "are" second occurrence should be --and--.

Signed and Sealed this

Fifteenth Day of December 1981

[SEAL]

Attest:

GERALD J. MOSSINGHOFF

Attesting Officer    Commissioner of Patents and Trademarks